Dec. 13, 1966    R. A. HAMILTON    3,291,321
HYDRAULIC POSITIONER
Filed March 31, 1964    6 Sheets-Sheet 1

INVENTOR.
RALPH A. HAMILTON
BY
George C. Sullivan
Agent

Dec. 13, 1966    R. A. HAMILTON    3,291,321
HYDRAULIC POSITIONER

Filed March 31, 1964    6 Sheets-Sheet 2

INVENTOR.
RALPH A. HAMILTON
BY
George C. Sullivan
Agent

FIG. 3.

INVENTOR.
RALPH A. HAMILTON
BY
George C Sullivan
Agent

Dec. 13, 1966  R. A. HAMILTON  3,291,321
HYDRAULIC POSITIONER

Filed March 31, 1964  6 Sheets-Sheet 5

INVENTOR.
RALPH A. HAMILTON
BY
George C. Sullivan
Agent

FIG. 11.

INVENTOR.
RALPH A. HAMILTON
BY
George C. Sullivan
Agent

United States Patent Office 3,291,321
Patented Dec. 13, 1966

3,291,321
HYDRAULIC POSITIONER
Ralph A. Hamilton, Glendale, Calif., assignor to Lockheed Aircraft Corporation, Burbank, Calif.
Filed Mar. 31, 1964, Ser. No. 356,182
16 Claims. (Cl. 214—1)

This invention relates to means for hydraulically orienting structures. More specifically, it relates to means for moving structural elements through six degrees of freedom and for maintaining the ultimately achieved position during structural connection procedures.

Although the product of this invention has broad application in the positioning of various structures to facilitate the accomplishment of related procedures, e.g., mechanical attachments, its primary utility is found in orienting jig fittings relative to jig frames and in retaining the positions while the fittings are permanently secured to the frames. Therefore, although for clarity of explanation the following description is directed to the jig fitting positioning application, it is not to be taken as limiting further appropriate application of the invention.

Various approaches have heretofore been explored in the jig building art in an effort to reduce procedural complexity, time consumption, accuracy, cost, etc. It is generally accepted that more time is required in accurately positioning the jig detail components in the jig frame than is required in any other procedural phase. Control of positioning is normally accomplished through the use of optical tooling. Preparatory to finally securing the detail components, certain pre-selected loft points on the fixture to be positioned are normally aligned with relation to the jig frame, the procedures being similar or identical to those used for many years throughout the industry. In aircraft work many "universal" devices have been designed in an attempt to provide fixture positioning and holding apparatus. These attempts have been generally unsuccessful because of the expense of the "device" and associated equipment, adapters, etc.

Additionally, trial and error by physically tedious handtool methods in bringing the fittings to their ultimate locations have been highly inefficient from both the accuracy and the time consumption standpoints.

Utilization of the present invention has resulted in an actual reduction of approximately 80% in the time required for the precision locating of fittings. Moreover, this has been accomplished with a minimum of instruction to personnel operating the equipment. Through use of the invention, bulky and cumbersome loads may also be handled easily without undue physical exertion by personnel and with the elimination of attendant dangers.

It is an object of this invention to provide means for accurately orienting structures in a desired position in a relatively short time period.

Another object is to provide hydraulically operable means for positioning one structural element relative to another structural element in a relatively rapid and accurate manner.

Still another object is to provide a device whereby jig setup time, inaccuracy, cost and danger to personnel are materially reduced.

Yet another object is to provide means for orienting and retaining jig fittings until secured to a jig frame.

A further object is to provide means for moving structure vertically, horizontally, linearly and in vertical, horizontal and axial rotations.

These and other objects of invention will become more apparent when considered in light of the description, claims and the following drawings, in which:

The invention generally comprises a base upon which is mounted a carriage, the carriage being retained and adapted to be universally positioned by hydraulic means. Control means is provided whereby structure secured to the carriage may be moved in any or all of the six basic degrees of freedom. A plurality of hydraulic cylinders actuatable individually or in combination mounted upon the frame are also attached to the carriage, both ends of the cylinder being mounted for universal movement. One pair of the cylinders are adapted to move the carriage laterally, one cylinder moves it vertically, and three cylinders control linear movement.

The invention additionally includes control means for automatically centering the cylinder pistons.

In the practice of the present invention means is provided, for example, for moving a jig fitting with respect to the jig about the six degrees of freedom heretofore described. Similar fittings in the prior art have been positioned by incrementally moving the fittings in a trial and error fashion. This was normally accomplished through the use of clamps, the clamps being loosened and tightened as necessary to facilitate fixture movement by tapping it with a hammer or similar means until the ultimate location was finally achieved.

Figures 1, 4:
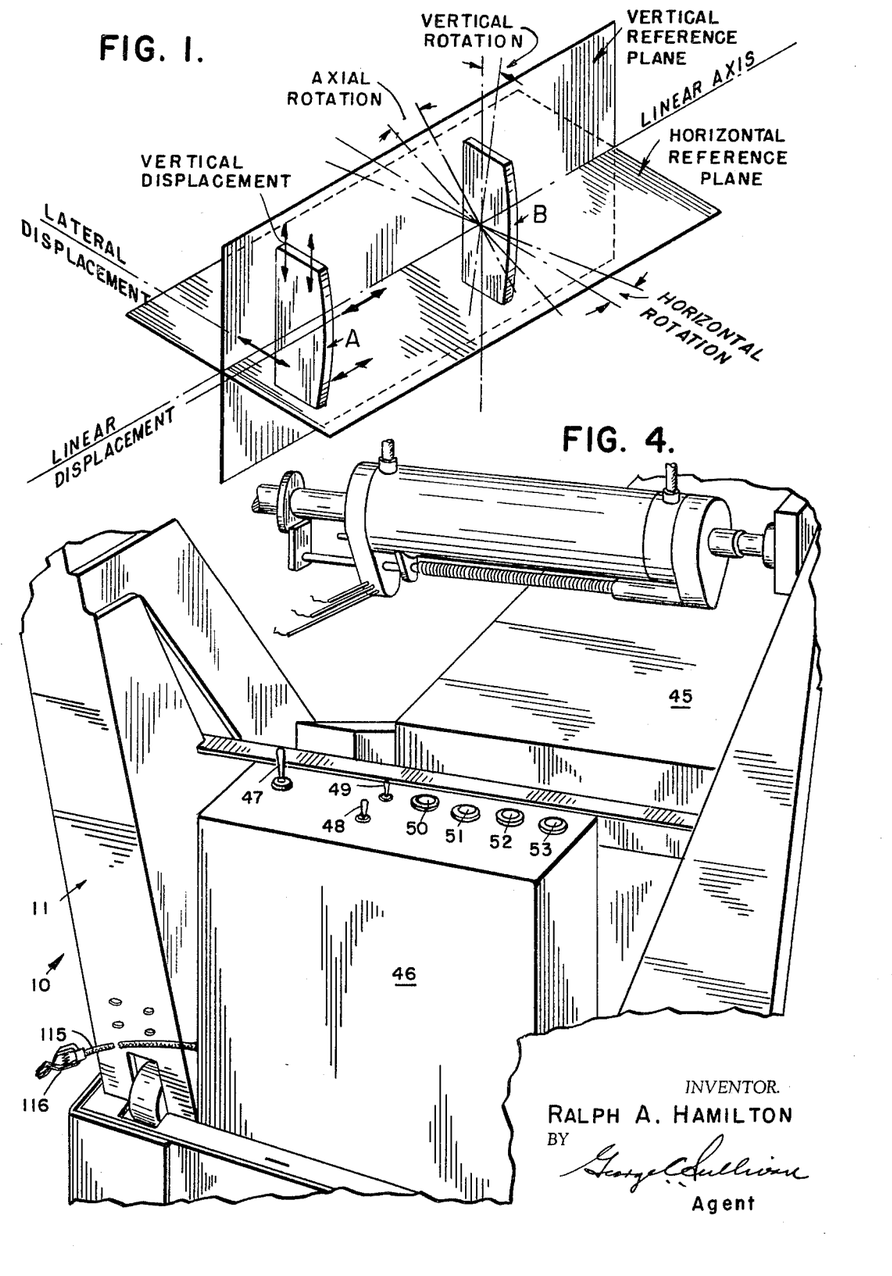
FIGURE 1 is a schematic representation of a pair of jig fittings illustrating the six degrees of freedom of such fittings.
FIGURE 4 is a cut-away perspective showing a portion of the locator illustrating its electrical panel and further illustrating an actuating cylinder and its centering mechanism.

Regardless of the alignment method utilized it is necessary that the fitting be moved in the basic six degrees of freedom in order to ultimately achieve the desired locations. These six degrees of freedom are schematically illustrated in FIGURE 1 to provide a clear visualization of the function of the present invention. Therein a pair of fittings A and B are representatively illustrated as being aligned on a common liner axis. Movement of either of the fittings along this linear axis is normally referred to as linear displacement. Mutually perpendicular, vertical and horizontal reference planes are similarly illustrated, the line of intersection of these planes being the aforementioned linear axis. Movement of the fittings along the horizontal plane normal to the linear axis is termed lateral displacement and movement along the vertical plane normal to the linear axis is termed vertical displacement. Rotation about the linear axis is termed axial rotation, rotation in the vertical plane about a horizontal axis (not shown) is vertical rotation, and rotation in the horizontal plane about a vertical axis (not shown) is considered to be horizontal rotation. Each of these displacements and rotations is referred to as one degree of freedom and each is illustrated in FIGURE 1. These terms are utilized throughout the specification as descriptive of the movements accomplished by the present invention in its various phases of operation.

Figures 2, 5, 6:
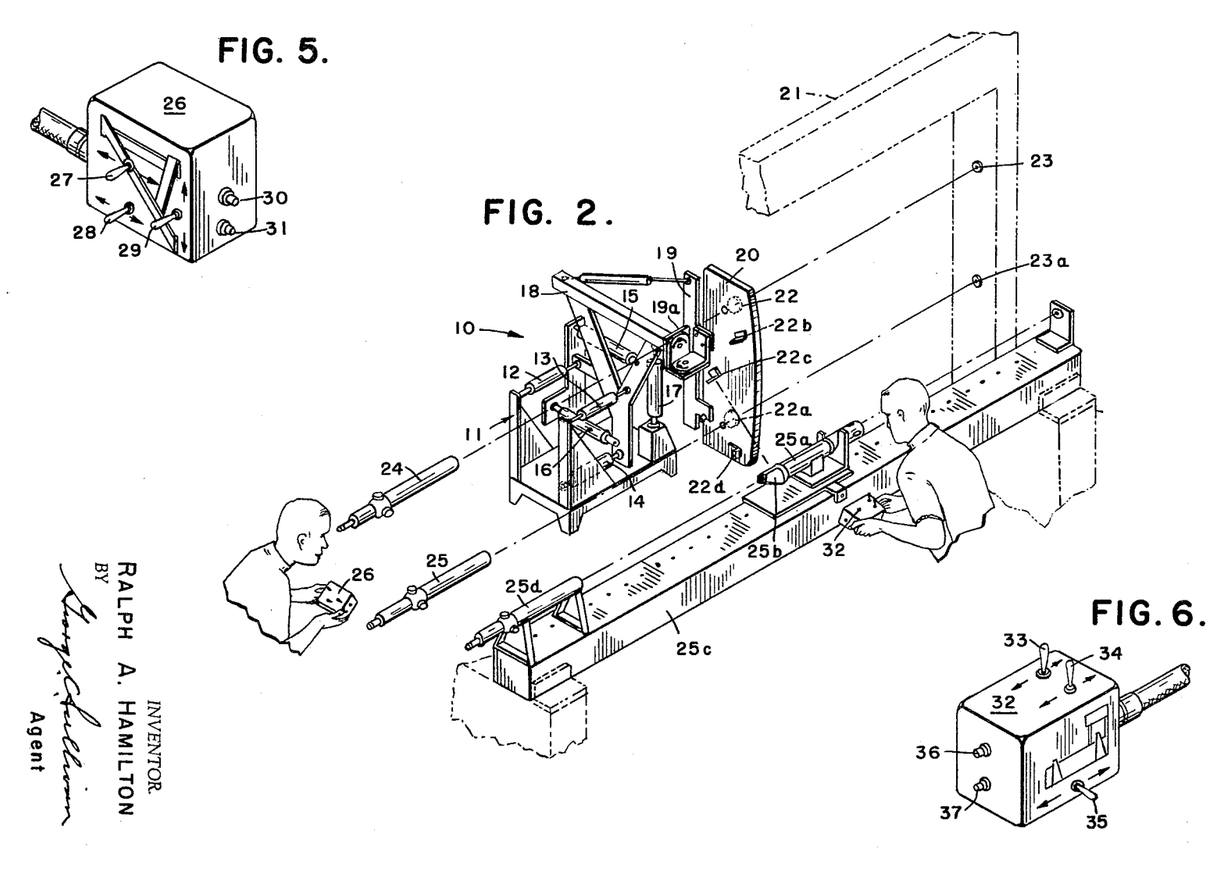
FIGURE 2 is a schematic drawing in perspective illustrating the hydraulic locator supporting a fitting which is being positioned and showing an optical system of references by which fitting location is determined.
FIGURES 5 and 6 are perspective views of cylinder control boxes.

FIGURE 2 illustrates the invention in semi-schematic form to provide an understanding of its general aspects as applied to utilization in the position of a jig fitting. It will additionally aid in understanding the method utilized in optically sighting target points relative to the structure being positioned. The hydraulic positioner of this invention is generally illustrated in FIGURE 2 by the numeral 10. The hydraulic positioner 10 includes a frame 11 having a plurality of hydraulically actuatable cylinders 12 through 17, each cylinder having one of its ends universally connected to the frame, preferably through a conventional ball joint. The piston rod extending from each hydraulic cylinder is similarly universally attached to a yoke or floating carriage 18. In the preferred embodiment cylinders 12, 13 and 14 are approximately mutually parallel. When the pistons contained in the various cylinders are in their neutral positions, cylinders 12 and 13 lie in a common horizontal plane, cylinders 13 and 14 lie in a common vertical plane perpendicular to the plane of cylinders 12 and 13, cylinders 15 and 16 are oriented in a common vertical plane which is normal to the horizontal and vertical planes in which cylinders 12, 13 and 14 lie, and a cylinder 17 is vertically oriented in the same plane or a plane parallel to the vertical plane within which cylinders 15 and 16 lie.

It is of significance to the invention that the floating carriage 18 is supported only by its connections to the aforementioned cylinders for movement responsive to cylinder actuation; hence, the "floating" characteristic of the carriage is accomplished. Cylinders 12 through 17 may be actuated individually or in combination, thereby moving the carriage 18 in any one or a combination of the six degrees of freedom.

At one extremity of the carriage 18 an attachment means, normally in the form of a positioning bar 19 and protractor head combination 19a is provided. The structure to be positioned, e.g., fitting 20 in FIGURE 2, is shown affixed to the attachment bar 19 for ultimate positioning with respect to a jig frame 21, the upper portion of which is shown by dotted lines for clarity of visualization. The fitting normally contains a plurality of targets whereby the accuracy of alignment with respect to the jig frame 21 may be detected. For example, a pair of targets 22 and 22a are retained upon the fitting 20 in a manner such that they may be ultimately aligned with a pair of lines of sight pre-established between a pair of alignment telescopes, transits or similar means, such as illustrated at 24 and 25 (supported by jig structure, not shown) and a pair of targets 23 and 23a mounted upon the jig frame 21. The targets 22 and 22a, when so positioned on the fitting, are utilized for lateral and vertical displacement and axial rotation alignment. Illustrations of a typical target image appear in FIGURES 9 and 10, the bull's eye being the center pattern of the target 22 and the cross hairs 24a being contained in the alignment telescope 24, for example. Additionally, other similar targets 22b, 22c and 22d may be located on the fitting 20 for alignment by a pre-positioned alignment telescope 25a and appropriate reflector means 25b mounted upon the length-controlling tooling bar 25c which is affixed to the jig frame 21. These latter targets are used for alignment of linear displacement, and vertical and horizontal rotation. A telescope 25d provides proper angular control for telescope 25a. An alignment sequence will be more fully explained hereinafter.

As may be easily visualized from FIGURE 2, simultaneous actuation of cylinders 12, 13 and 14 serves to move the floating carriage 18 linearly. Cylinders 15 and 16 accomplish lateral movement and cylinder 17 is utilized for vertical movement. Actuation of selected combinations of these cylinders results in the various rotational movements.

Actuation of the hydraulic cylinder pistons is initiated in the preferred embodiment by operators through the utilization of a pair of control boxes (FIGURES 5 and 6). The control box 26 includes six toggle switches, switches 27, 28 and 29 being on the near side and duplicates (not shown) being located on the opposite side. These switches are oriented in the same pattern upon the control box as are the hydraulic cylinders 15, 16 and 17 upon the frame 11. Utilization of switches on both sides of the control boxes permits correct orientation of the box to match the positioner when viewing it from either side. The switch 27 is movable laterally in the same respects as is the cylinder 15. Movement of the switch 27 to the left causes the piston rod of cylinder 15 to retract, moving the upper portion of the floating carriage 18 to the left (as viewed in FIGURE 2). Moving the switch to the right has the opposite effect, causing the piston rod of cylinder 15 to extend and move the upper portion of the floating carriage 18 to the right. Similarly, movement of the switch 28 controls the cylinder 16 to move the lower carriage portion in like manner. The movement of the switch 29 to the upper or lower position controls the cylinder 17 for respectively raising or lowering the carriage 18. In no case does cylinder movement occur, however, until one of a pair of "action" switches 30 or 31 is pressed. The various movements described are accomplished either rapidly or relatively slowly dependent upon which of these action switches is engaged. Engagement of the switch 30 accomplishes rapid movement and engagement of the switch 31 accomplishes the movement in a relatively slower fashion. All toggle switches 27, 28 and 29 and their duplicates on the opposite side of the control box are of the "off center" type and no action occurs unless they are moved from their off or perpendicular positions.

The control box 32 (FIGURE 6) similarly includes a series of switches, these switches being oriented upon the control box to simulate the positions of the cylinders 12, 13 and 14 upon the frame 11. The switches 33, 34 and 35 are thus moved in the same directions the controlled cylinders are to be moved to respectively control such movements. A duplicate of switch 35 is provided on the far side of box 32 for correct orientation of the box to the positioner when viewing the positioner from the far side. Fast and slow action switches 36 and 37 are also provided.

Figure 3:
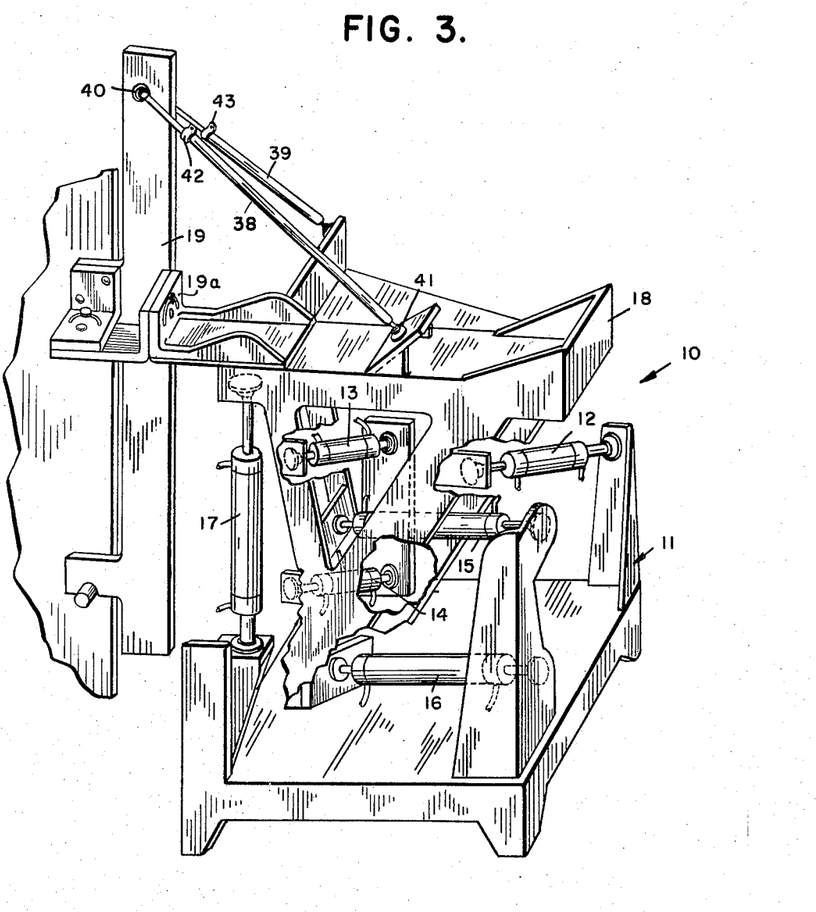
FIGURE 3 is a perspective, partially cut-away of the hydraulic locator viewed from the floating carriage region.

The structure of the hydraulic positioner 10 is illustrated in somewhat greater detail in FIGURES 3 and 4. FIGURE 3 illustrates the preferred configuration of the floating carriage 18. Therein the carriage is of a generally triangular configuration. This configuration has been found to provide maximum structural support while simultaneously providing attachment points for the hydraulic cylinders. Upon the extreme left of the floating carriage, in the illustrated position, the means for attaching structure to be positioned is provided. This attachment means normally comprises the aforementioned attachment bar 19 connected to the protractor head combination 19a in a swiveling relationship. Each of these components is of a conventional nature and may be varied in accordance with particular requirements. The relative position of the attachment bar with respect to the protractor head is usually maintained more rigid by a pair of telescoping struts or braces 38 and 39 conventionally connected to the attachment bar 19 and the carriage 18; for example, by universal joints such as shown at 40 and 41. The braces 38 and 39 usually include lock means 42 and 43 to maintain or vary their longitudinal dimensions, and to thereby rigidly secure the attachment bar 19 to the floating carriage 18 in a desired initial position. Attachment bar 19 is usually perforated for bolting or otherwise provided with attachment means whereby jig fittings or other structures to be positioned may be affixed to it.

Figure 7:
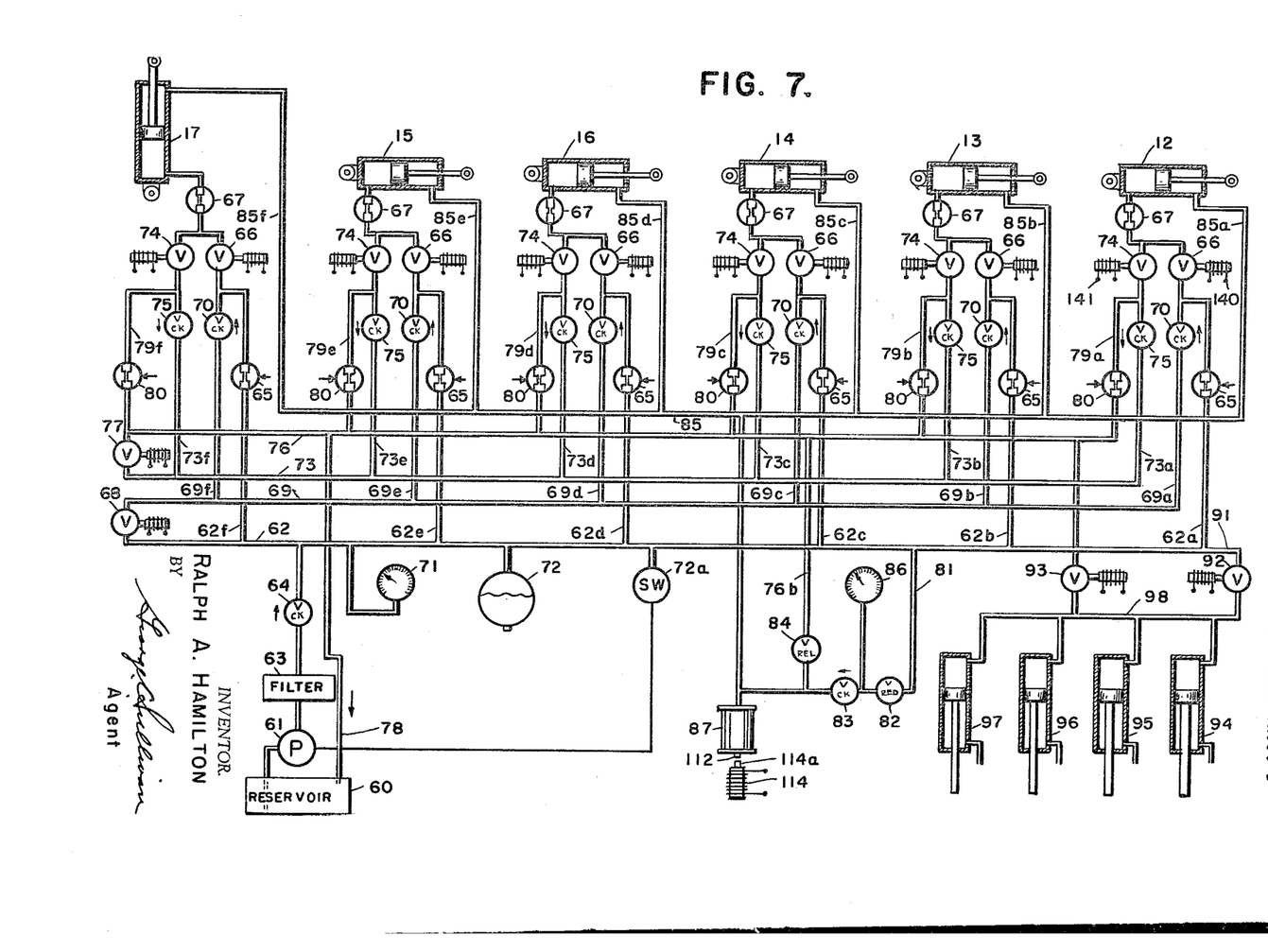
FIGURE 7 is a schematic drawing of the hydraulic system.

The frame 11 of the basic hydraulic positioner 10 should be constructed with sufficient rigidity to accept the loads applied thereto resultant from actuation of the hydraulic cylinders and to prevent vibration while securing a jig fitting to the jig frame. It is also preferably provided with casters (not shown) to facilitate its movement. However, when casters are used, it is of importance that means be provided to either lock the casters or to lower and raise the frame to and from the floor as desired to thereby provide stability during operation. Any conventional wheels, locks or means for raising and lowering may be provided. Conventional cam means have been found acceptable in this regard. Hydraulic cylinders are sometimes alternatively provided. Such alternative means is schematically represented in FIGURE 7 discussed hereinafter. It is also desirable that a conventional stabilizing means be provided upon at least one corner of the frame 11.

The hydraulic positioners 10 includes an hydraulic assembly panel 45 (FIGURE 4) in which various flow control valves and lines are situated. The components contained within this assembly are conventional in nature, their inter-relationship also being described below with respect to the hydraulic system schematic of FIGURE 7.

Similarly, an electrical control panel 46 (FIGURE 4) is provided which includes the basic electrical components and certain controls not included in control boxes 26 and 32. The electrical control panel 46 includes a power switch 47, and a pair of centering switches 48 and 49, the switch 48 being the "on" switch and the switch 49 being the "off" switch. Also included in the electrical control panel are a series of indicators 50, 51, 52 and 53 in the form of various colored electric lamps. These lamps serve to indicate operating conditions existing at a particular moment. Each of the components and connections in the electrical system being conventional in nature, the complete circuitry is not illustrated, only the operational components necessary to an understanding of the invention being shown.

Although the structure ultimately positioned may be attached to its related structure in any conventional manner, it has been found effective and expeditious to provide tangs (not shown) upon the structure being positioned. The tangs are inserted into cup-like receivers in order that the ultimate relative positions, when achieved, may be secured by pouring a quick hardening material into the cup member around the tang and allowing it to harden. A material such as that known commercially as Kerrstone, commonly utilized in dental practice, has been found to be superior for this use.

Referring now to the hydraulic system schematic of FIGURE 7, hydraulic cylinders 12 through 17 are schematically illustrated. Each cylinder is connectable to one of three pressures, to atmospheric pressure, to a relatively low or intermediate hydraulic pressure portion (hereinafter referred to as "intermediate pressure") and to a relatively high hydraulic pressure portion (hereinafter referred to as "high pressure") of the system. An hydraulic fluid reservoir 60 provides a fluid source from which a high pressure pump 61 is fed. The pump 61 is connected to a high pressure line 62 through a filter 63 and a check valve 64. The high pressure line 62 includes a series of branch lines 62a through 62f, each such line leading through a separate, adjustable fluid friction valve 65, a solenoid valve 66 and an orifice 67 to the respective high pressure sides of the hydraulic cylinders 12 through 17. The adjustable fluid friction valves 65 are adjusted to provide slow speed of movement when extending the piston rods of cylinders 12 through 17. The high pressure line 62 is additionally connected to all cylinders through a solenoid valve 68, a series of individual branch lines 69a through f, check valves 70, the solenoid valves 66, and orifices 67. The branch lines 69a through f and the branch lines 62a through f are conventionally joined by a combining T between the fluid friction valves 65 and solenoid valves 66. High speed movement of any cylinder is thus provided by effectively by-passing the fluid friction valves 65 when the solenoid valve 68 is opened. The check valves 70 are located in each branch line 69 ahead of the combining T to prevent fluid transfer from one cylinder to another.

The pressure in the line 62 is indicated on a pressure gauge 71 and is maintained constant by an hydraulic accumulator 72 and a conventional pressure control switch 72a.

Two separate series of branch fluid return lines 73a through f and 79a through f are provided for returning the fluid from their respective cylinders to reservoir 60, to cause retraction of the related pistons and interconnected piston rods.

Each of the return lines 79a through f includes therein a solenoid valve 74, and a fluid friction valve 80 and connects to the common manifold return line 76, connected, in turn, into the main return line 78 leading to the reservoir 60. These return lines 79a through f, are used for slow speed retraction of the piston and interconnected piston rod when a solenoid valve 74 is opened.

For high speed retraction of the piston and interconnected piston rod, the lines 73a through f receive fluid passed through solenoid valve 74 and pass it, in turn, through check valves 75, the lines being connected by a combining T between these valves. Lines 73a through f then lead into the common manifold line 73, provided, however, that the high speed control solenoid valve 77 is also opened at the same time. Valve 77 allows the fluid under pressure in manifold line 73 to pass through solenoid valve 77 into the common manifold line 76 from whence it is transferred to the main return line 78 and is returned to the reservoir 60.

The lines 73a through f effectively bypass the slow speed control fluid friction valves 80 of lines 79a through f when the high speed solenoid valve 77 is opened and provide for high speed retraction of the piston rods of the interconnected cylinders.

Check valves 75 serve to prevent fluid transfer from one cylinder to another.

Lines 62, 62a through f, 69, and 69a through f comprise the high pressure portion of the hydraulic system. A pressure preferably in the order of 700 p.s.i. is maintained in this high pressure portion of the system.

A fluid line 81 connected to the high pressure line 62 leads through a pressure reducing valve 82, a check valve 83, a pressure relief valve 84, and is connected to a main intermediate pressure line 85. A pressure indicating gauge 86 is usually disposed between the reducing valve 82 and the check valve 83 to provide a reading of system pressure in this region. Additionally, a pulsing unit 87 is connected into line 81 between the pressure relief valve 84 and the main intermediate pressure line 85. The structure and operation of this pulsing unit 87 is set forth hereinafter. A series of individual branch lines 85a through f are provided, each one leading from the main intermediate pressure line 85 to a respective intermediate pressure side of each of the hydraulic cylinders 12 through 17.

The intermediate pressure, in this preferred embodiment, is approximately 350 p.s.i. and is applied at all times to one end of each cylinder. It serves to return the piston toward the high pressure end of the cylinder when the fluid release solenoid valve 74 is opened.

When the high pressure (700 p.s.i.) is allowed to enter the high pressure end of a particular cylinder responsive to the opening of a solenoid valve 66 its piston is pressed toward the intermediate pressure end of the cylinder. This raises the pressure in line 85, its branch lines, and the interconnected portion of line 81. The pressure relief valve 84 allows excess fluid to flow through line 76b into low pressure manifold 76 and through main return line 78, into reservoir 60.

The pressure relief valve 84 is set approximately 20 p.s.i. higher than the intermediate pressure as established by the pressure reducing valve 82.

An hydraulic sub-system for raising and lowering the hydraulic locator frame 11 is sometimes included as a portion of the main hydraulic system. A representative system is illustrated in the schematic of FIGURE 7. Therein, a fluid line 91 connected to the line 62 leads through a solenoid valve 92 and is connected to the manifold line 98. A second solenoid valve 93 allows the fluid to be returned through manifold 76 and main return line 78 to reservoir 60. A plurality of hydraulic cylinders 94, 95, 96 and 97 are mounted adjacent the respective casters and are connected in parallel into the manifold line 98 and are attached to the frame 11 such that their pressurization by opening solenoid valve 92 causes cylinder actuation and a resultant lifting of the frame 11 with respect to the wheels upon which the frame is mounted. The positioner may then be moved about on its casters. Closing valve 92 and opening solenoid valve 93 causes release of the fluid in cylinders 94–97 and the frame 11 will return to a stable position.

Each of the check valves and solenoid valves in this system is of conventional construction, as are also the pump, the filter, the pressure reducing valves, the pressure relief valve, and the adjustable fluid friction valves.

Figure 8:
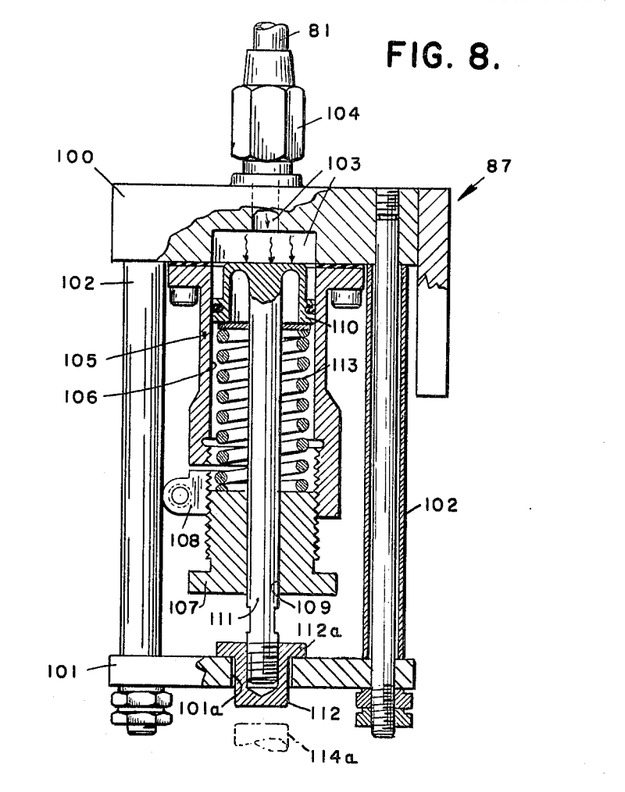
FIGURE 8 is a cut-away of the pulsing unit.

The pulsing unit 87 is specifically illustrated in cross-section and in a preferred embodiment in FIGURE 8. It generally comprises a pair of plates 100 and 101 separated by a plurality of spacers 102. The upper plate 100 includes a passage 103 which has a major and a minor bore and communicates between a fitting 104 through which the pulsing unit is connected to line 81 in the hydraulic system. Sealably attached to the upper plate 100 is a cylinder 105 having a bore 106 therein communicating with the passage 103 and of approximately the same diameter as the major bore portion thereof. An adjustable plug 107 is threadedly engaged in a lower extremity of the bore 106 and is retained in its axial position by a clamp portion 108 of the cylinder 105. The adjustable plug 107 is provided with a central bore 109. A piston 110 is axially disposed within the bore 106 for reciprocation therein and is sealed with respect thereto, as, for example, by an "O-ring." The piston 110 is affixed to a shaft 111 leading through the bore 109 into threaded engagement with a striker nut 112. The striker nut 112 includes a flange 112a which is adapted to abut an upper surface of the plate 101. The main body portion of the striker nut 112 extends through a central perforation 101a in the plate 101. A compression spring member 113 is axially disposed within the bore 106 to normally urge the piston 110 in an upward direction and substantially counterbalance the fluid pressure introduced through the passage 103. The spring pressure is adjustable by means of plug 107 to result in a null position of the piston wherein the flange 112a is maintained in close proximity to but out of physical contact with the upper surface of plate 101. A tip 114a of a solenoid impactor 114 (FIGURE 7) is positioned adjacently spaced from the tip of the striker nut 112. The function of this pulsing unit is to provide incremental piston travel, as further explained below in connection with the system operation.

Figure 11:
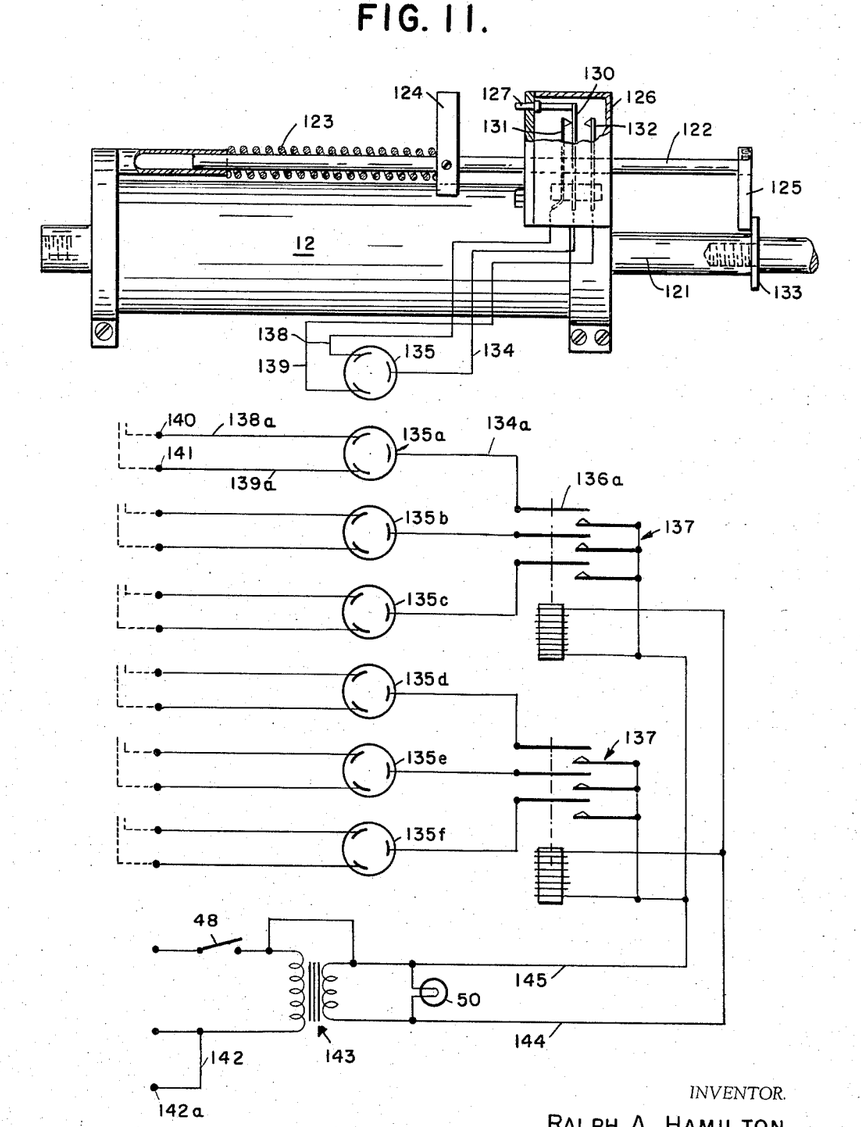
FIGURE 11 is a view of a hydraulic actuating cylinder with centering structure interconnected to schematically illustrated centering circuitry.

In order that the operator may have an optimum piston travel for each hydraulic cylinder in either direction preparatory to a functional procedure, a means for centering the piston rods thereof is provided. The preferred means for accomplishing the centering is illustrated in FIGURE 11. Therein, cylinder 12 is representatively shown as having a piston rod 121 and an additional rod 122 reciprocably mounted longitudinally on its exterior, the rod 122 being biased to the right by a spring 123. A switch contact plate 124 and a piston rod follower plate 125 are respectively attached approximately centrally and at an outer extremity of the rod 122 for movement therewith. A conventionally constructed "off center" switch 126 (schematically illustrated) is mounted upon one extremity of the cylinder 12, a switch plunger 127 being actuatable by the switch contact plate 124. The plunger 127, when held in a centered position by the plate 124, orients a switch element 130 out of engagement with a pair of electrical contacts 131 and 132 disposed on either side of the switch element. Normally, switch element 130 is spring biased to the left in engagement with contact 131. Movement of the plunger 127 a sufficient distance to the right results in an electrical connection of the contact 132. The housing of switch 126 acts as a stop for the contact plate 124 to prevent its excessive movement to the utlimate destruction of the electrical contact 132. The spring 123 tends to urge the follower plate 125 into engagement with an actuating means, usually in the form of a washer 133, mounted upon the piston rod 121. This spring-actuated engagement permits movement of the plate 125 and its interconnected components responsive to movement of the piston rod 121. A three-conductor cable is provided with conductors 134, 138 and 139 so arranged that insertion of plug 135 into socket 135a connects switch element 130 through conductors 134 and 134a to one leg 136a of the ganged switch 137. Contact 131 is connected through conductors 138 and 138a to one terminal 140 of the solenoid valve 66 (of cylinder 12). Contact 132 is connected through conductors 139 and 139a to a contact 141 of the solenoid valve 74 (of cylinder 12, FIGURE 7). A separate line 142 leads to terminal 142a. Conductors (not shown) connect this terminal to the opposite terminals of all the solenoid valves 66 and 74. Each of the cylinders 12 through 17 includes a switch, identical to "off-center" switch 126 and conductors and disconnect plugs adapted for connection to the respective disconnect sockets 135a through f and to one element of a ganged switch forming a part of the relays 137. Similarly, electrical conductors lead from the respective disconnect sockets to the appropriate solenoid valves 66 and 74 in conjunction with the various hydraulic cylinders. The electrical circuit also contains the means position switch 48 in the power source line, a transformer 143 and power supply lines 144 and 145 connected in parallel to the relays 137.

In operation, the centering circuitry functions in the following manner. When the mean position switch 48 is open, as illustrated, no power is provided to the circuit. When it is desired that all pistons be centered this mean position switch 48 is closed, supplying power through the transformer 143 and the power supply lines 144 and 145 to the relays 137. The coils of the relays are energized, causing the ganged switches to be closed. Presuming that at this time all the disconnect plugs are connected and the cylinders to be centered are in the condition illustrated with respect to the cylinder 12 of FIGURE 11, the circuit of the upper relay 137, switch element 136a to the disconnect plug 135a is completed through the disconnect plug 135, the line 134, the switch element 130, the electrical contact 131 and the conductors 138 and 138a again via the disconnect plug elements 135 and 135a. The circuit to the solenoid of valve 66 via the electrical conductor 138a and terminal 142a is thereby completed. Actuation of the solenoid valve 66 (FIGURE 7) permits hydraulic fluid under a constant pressure to be introduced into the left side of the cylinder, thereby causing the piston rod 121 to be extended and permitting the spring-biased rod 122, which carries the plates 124 and 125, to follow the washer 133 in its movement to the right. This action continues until such time as the plate 124 engages the plunger 127, causing the interconnected switch 130 to be moved to a central position between the electrical contacts 131 and 132, thereby interrupting the circuit and de-energizing the solenoid valve 66. Such de-energization stops the flow of hydraulic oil to the cylinder 13, thereby halting movement of its piston. The cylinder 12 is centered at this time and will remain in such condition until repositioning by further hydraulic action.

At the time the centering sequence started, were the piston to the right of center and a circuit completed through the conductors 134 and 139 and conductor 134a, as a result of contact between the switch elements 130 and 132 responsive to movement of the plunger 127 by the plate 124, the solenoid valve 74 would be energized. In such event, the solenoid valve 74 would open, permitting fluid to be forced from the left side of the cylinder 12 by the pressure of fluid under constant intermediate pressure on the right side of the piston until such time as the plate 124 permitted the switch 130 to be removed from its engagement with the electrical contact 132, thereby breaking the circuit, de-energizing the solenoid and stopping piston movement at the centered position.

When the centering switch 48 is closed the centering action is accomplished with respect to each of the cylinders 12 through 17, irrespective of the positions of their respective pistons.

A typical operational sequence utilized in positioning a fitting with respect to a jig frame will now be described. Although this description is set forth with respect to a specific structure, it is to be understood that the application of the hydraulic positioner is not so limited. It may be utilized for retaining and positioning any structure capable of attachment thereto and movement thereby. Also, the sighting for location and securing of the structure during the subsequent positioning is capable of achievement by a variety of conventional approaches. The physical steps accomplished preparatory to movement of the structure to be positioned are also capable of being varied in many respects. Additionally, while the individual operational steps of the hydraulic positioner, per se, are substantially the same regardless of the structure being positioned, or the procedures performed preparatory thereto, steps may be varied in sequence as desired.

In preparation for the ultimate jig fitting positioning it is usually desirable to first accurately position the targets and the optical instruments upon or with respect to the jig frame. The fitting may then be moved into position with respect to the jig without the introduction of extraneous problems. Referring to FIGURE 2, targets 23 and 23a and any other similar targets upon the jig frame 21 are precisely pre-located. Similarly, alignment telescopes 24 and 25, for example, or other suitable sighting means, are positioned upon, or relative to, the jig frame 21 for alignment with the targets 23 and 23a, so as to provide lines of sight which are ultimately used as basic reference lines to which all fittings are located.

The hydraulic positioner 10 is moved into its intended operational position and the frame 11 is lowered onto the floor by means of conventional cam members, the hydraulic jack system described with respect to FIGURE 7 through the introduction of fluid into the cylinders 94 through 97 from line 62 via line 91 responsive to the actuation of the solenoid valve 92, or by other suitable means. This provides greater structural stability to the hydraulic positioner than if it were to be operated while resting on wheels. Additionally, a vertical adjustment (not shown) is usually provided upon one leg of the frame 11 to lend further stability. Any conventional stabilizing means may be provided for this purpose. Each of the hydraulic actuating cylinders 12 through 17 should be centered prior to attaching the fitting and initiating rough positioner operation preparatory to final positioning. Maximum piston travel in both directions is thereby facilitated. This centering procedure is accomplished by first moving the power switch 47 (see FIGURE 4) to the "on" position, thereby electrically energizing the system. A visual indication of this "power on" condition is provided by the illumination of indicator light 51. This light remains illuminated so long as the locator is operational. The centering switch 48 is then engaged and each cylinder is centered in the manner explained above. The indicator light 50 becomes illuminated and remains on until all pistons have been centered and switch 48 is released.

The fitting 20, to be ultimately positioned with respect to and secured to the jig frame 21, is clamped securely to the attachment bar 19 or to intermediate attaching means. Together with protractor head 19a, the attachment bar 19 is adjustable for basically orienting the fitting 20. In adjusting the attachment bar 19 the braces 38 and 39 may be lengthened or shortened as necessary by means of the locks 42 and 43 (FIGURE 3) to obtain the desired initial orientation and to stabilize the position and the holding ability of the attachment bar.

Once the cylinder centering and the other preliminary steps heretofore described have been accomplished, the fitting 20 is ready to be brought to its ultimate location by the hydraulic positioner 10. The targets 22 and 22a are attached to fitting 20 and their positions relative to the reference lines of sight are accomplished by viewing both targets through the optical alignment means 24 and 25.

Figure 9:
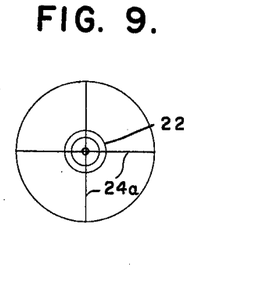
FIGURES 9 and 10 are illustrations of typical target center images in unaligned and aligned condition, respectively.
Figure 10:
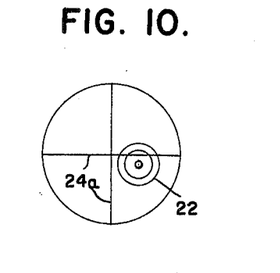

Although other target configurations may be utilized, as mentioned above, it has been found desirable that targets 23 and 23a be of the bull's-eye type illustrated in FIGURES 9 and 10. The targets 22 and 22a are usually also of this same type and are intended to indicate those specifically illustrated. When desired, the targets 22 and 22a may be removed for rechecking alignment of telescopes 24 and 25 to targets 23 and 23a. In FIGURES 9, 10 the typical telescope cross hair alignment image is shown superimposed upon the target image, as viewed through telescope 24. For convenience, only the cross hairs 24a of the telescope 24, and the bull's-eye 22 are actually shown.

FIGURE 10 illustrates a condition in which the fitting target 22 is out of alignment with the line of sight. The bull's-eye target 22 is shown displaced to the right and below the cross point of lines 24, the intersection of the crossed lines image being the center of the line of sight of the alignment telescope 24.

Since the bull's-eye of the targets 22 and 22a and the crossed lines of the telescopes must be precisely aligned to assure ultimate alignment of fitting 20 in the jig, the fitting must be moved from the position of FIGURE 10 until the bull's-eye target is exactly positioned coincident to the crossed line image of the telescope 24, as illustrated in FIGURE 9. Therefore, the fitting, as represented by the target, must be moved to the left (horizontal displacement) and upward (vertical displacement).

Movement of the fitting 20, in alignment procedures, is controlled by actuating selected ones of the hydraulic cylinders. Lateral displacement is accomplished by extending or retracting the pistons of hydraulic cylinders 15 and 16. Since cylinders 15 and 16 are both connected to the floating carriage 18, their actuation causes the floating carriage to move horizontally, carrying the fitting 20 with it. Preparatory to accomplishing this movement, the switches 27 and 28 upon the control box 26 (FIGURE 5) are moved either to the left or to the right, in accordance with the direction in which the fitting 20 is to be moved; to the left in the present instance. Hence, conditions for a retraction of the pistons in cylinders 15 and 16 are established. It is to be noted that movement of either of the switches 27 or 28 does not initiate cylinder action. Rather, it simply establishes the proper direction of movement in which either a slow or a relatively fast actuation sequence may be accomplished. Since, in this instance, a relatively great distance must be traversed in lateral displacement, the first action should be a rapid one. Therefore, the fast action switch 30 is pressed, causing the solenoid valve 77 (FIGURE 7) to be opened by means of conventional electrical circuitry. Simultaneously, a circuit to the solenoid valves 74 of the cylinders 15 and 16 is completed and they are also caused to open. This permits hydraulic fluid in the cylinders 15 and 16, subjected to an intermediate pressure by the piston, responsive to the pressure in lines 85d and 85e, to be returned to the fluid reservoir 60 through orifices 67, solenoid valves 74, check valves 75, lines 73d and 73e, line 73, solenoid valve 77, and lines 76 and 78. This direct hydraulic action results in a relatively rapid retraction of the pistons in the cylinders 15 and 16, the ultimate speed being controlled by the orifices 67 which are pre-set to permit the passage of predetermined amounts of fluid. It has been found that a movement of approximately 4 inches per minute is a desirable piston travel speed for the fast sequence of operation. When the approximate target location has been achieved the fast action switch 30 is released. This causes the solenoid valves 74 and 77 to close, stopping pistion travel.

Fine adjustment to establish exact lateral target alignment is next accomplished by engaging the slow action switch 31. This opens only the solenoid valves 74 (not solenoid valve 77) in lines 79d and 79c and subjects the fluid to the restrictive action of the adjustable fluid friction valves 80 located in those lines. The adjustable fluid friction valves 80 present sufficient barriers to the fluid to retard its passage. An effective, but slight, pressure unbalance across the pistons of the cylinders 15 and 16 is thereby established, however, an outside force is required to momentarily overcome the static friction of system components and permit an incremental piston movement.

Simultaneous with the actuation of the solenoid valves 74 associated with the cylinders 15 and 16, a conventional pulsing solenoid 114 is also actuated. This solenoid has an impactor 114a adjacently spaced from the striker nut 112 of the pulsating unit 87 (FIGURE 8) such that each solenoid pulsation results in an impact of striker nut 112. This provides a slight movement of the pulsating unit piston 110 which is in actuating relationship with respect to the fluid in those portions of the lines 81 and 85 which contain fluid under intermediate pressure, as controlled by the pressure regulating valve 82. Hence, a small fluid shock pulse moves through the lines 81 and 85 and the branch lines 85a through f to the intermediate pressure sides of the cylinders 12 to 17. There is no effect upon those cylinders whose associated valves 74 are not open. When the valves 74 are open, as in the present cylinders 15 and 16 operation, this shock pulse is sufficient to overcome the static friction of the pistons, carriage mechanisms, etc. This allows small pressures and forces to be equalized and permits the pistons to retract a minute amount. Fluid traversing the fluid friction valves 80 is returned to the reservoir 60 via the lines 76 and 78.

Following completion of this pulse and the minute piston movement the original pressure relationship is reestablished responsive to the continued application of fluid pressure to the intermediate pressure side of the cylinders. A second actuation of the pulsating solenoid again initiates the pulsing sequence and permits a second incremental movement of the pistons. This sequence of actions continues for so long as the slow action switch 31 is engaged, a target movement of approximately .0001 inch being accomplished by each pulse in the preferred embodiment. This movement is continued until the operator views the horizontal alignment of target 22 coincident to the telescope line of sight. The action switch 30 is then released and movement of the fixture in vertical displacement to align the targets vertically is initiated.

Vertical displacement is accomplished in substantially the same manner as is horizontal displacement, with the exception that only cylinder 17 is actuated through the use of switch 29 upon control box 26. In accomplishing this movement the same fast and slow actuation sequence with respect to cylinder 17 is accomplished as heretofore described with respect to cylinders 15 and 16. Each of the related valves and orifices functions in a virtually identical manner with one major difference in the presently described situation. Since the target 22 must be moved upward, it is necessary that the piston of the cylinder 17 be extended, rather than retracted. Therefore, with the switch 29 placed in the up position, system actuation through the engagement of the fast action switch 30 results in the opening of the associated solenoid valve 66 and solenoid valve 68. This permits fluid under high pressure in the line 62 to pass through the solenoid valve 68, the line 69f, the check valve 70, the opened solenoid valve 66 and the orifice 67 into the high pressure side of the cylinder 17. Oil under intermediate pressure in the opposite side of the piston is forced, by this high pressure fluid action, through the lines 85f and 85. Being stopped by the check valve 83, it returns through the pressure relief valve 84 and the lines 76b, 76 and 78 to the reservoir 60. The draining of excessive oil is prevented by the pressure relief valve 84.

In the slow sequence of operation the solenoid valve 68 remains closed and any fluid entering the cylinder 17 via the orifice 67 and the solenoid valve 66 must first pass through the adjustable fluid friction valve 65. An effective slight unbalance is achieved in the same way explained with respect to cylinders 15 and 16, the slight pressure imbalance, however, tending to extend the piston in this instance. The pulsing unit 87 is actuated simultaneous with the actuation of the solenoid valve 66 to provide the described friction releasing action and the incremental extension of the piston of cylinder 17, fluid again returning to the reservoir via the route described.

Following completion of the operational sequence of cylinder 17 the target 22 will have been moved upward such that the ultimate relative position of target 22, as seen in FIGURE 9, is achieved. It will be understood that the procedures may be reversed or performed in various sequences, as desired, dependent upon the initial positions of the targets upon the fitting 20 and the directions required to achieve the alignment illustrated in FIGURE 9.

Axial rotation of the fitting 20 may be accomplished by simultaneously actuating either one of cylinders 15 or 16 in one direction while holding or actuating the other cylinder in the opposite direction. Similarly, linear displacement may be accomplished by simultaneously actuating cylinders 12, 13 and 14 (FIGURE 6) by means of switches 33, 34 and 35, respectively, and fast or slow action switches 36 and 37 located upon the control box 32. Vertical rotation is facilitated by actuating cylinders 12 and 13 in one direction while holding or actuating cylinder 14 in the opposite direction. Horizontal rotation may be accomplished by actuating cylinder 12 in one direction while simultaneously holding or actuating cylinders 13 and 14 in the opposite direction.

Conventional limit switches (not shown) are provided upon the piston rod ends of the various cylinders to prevent the carriage 18 from being moved into too great an angular position with the resulting possibility of breakage of cylinder joints. When either limit is reached a relay is actuated which stops all piston movement and an indicator light 52 is illuminated, preferably intermittently. Additionally, a buzzer may be intermittently sounded to provide a warning. In order to override the limit circuitry the centering "on" switch is activated for a short time. This returns command to the control boxes. The angular position of the positioner frame 11 is then readjusted to an angle nearer that ultimately required by the fitting, or the angle of the attachment bar and protractor head combination 19 is changed to allow the fitting to be placed at the required angle without exceeding the angular limits of the hydraulic locator.

A means is provided to call to the operator's attention any physical contact between the fitting being positioned and the jig frame. To indicate such a contact a contact safety clamp 116 (FIGURE 4) upon a conductor 115 leading from the hydraulic positioner electrical panel 46 is connected to the jig frame so that a low voltage electrical circuit will be completed when the fitting contacts the jig frame. The completion of this circuit rings a bell or illuminates indicator light 53, or both, while also stopping all hydraulic action in the cylinders. This prevents damage to the jig fitting or movement of the jig frame out of its precise prepositioned location. In order to reactivate the system the hydraulic locator 10 must be moved an amount sufficient to interrupt the contact.

Through the utilization of the hydraulic positioner of this invention it is possible to position relative structures quickly, safely and accurately, without excessive physical exertion.

While the specific embodiments of the invention have been shown and described herein it should be understood that certain alterations, modifications and substitutions may be made to the instant disclosure without departing from the spirit or scope of the invention as defined by the appended claims.

I claim:

1. A hydraulic locator comprising:
 a. a frame;
 b. hydraulic pressure-responsive means connected to said frame;
 c. carriage means connected to said power means opposite said frame and adapted to be moved by said power means and to support structure to be located; and
 d. control means for causing hydraulic pressure to be selectively introduced to said power means in a predetermined manner whereby said carriage and any structure attached thereto may be moved in any one or a combination of movements of six degrees of freedom said control means including separate rapid action and slow action controls forming portions of said control means for providing an initial fast movement of said power means and relatively slower incremental movement for final and precise positioning of structure supported upon said carriage means.

2. A hydraulic locator comprising:
 a. a frame;
 b. a plurality of hydraulic cylinders, each said cylinder having a first end universally connected to said frame;
 c. a movable piston in each said hydraulic cylinder, each said piston having a piston rod extending from a second end of its cylinder;
 d. a carriage having an end of each said piston rod universally connected thereto and adapted to be moved responsive to actuation of preselected ones of said hydraulic cylinders;
 e. means upon said carriage for securing structure thereto and for ultimate movement and positioning therewith; and
 f. control means connected to said hydraulic cylinders for controlling independent and conjunctive movement thereof in rapid action sequences and in full incremental sequences for respectively greater and lesser distant movement.

3. The hydraulic locator of claim 2 wherein said cylinders are operable in both extending and retracting sequences and oriented to preclude structural interference between cylinders irrespective of their sequential actuation.

4. The hydraulic locator of claim 2 wherein said control means comprises remote control boxes for controlling actuation of said hydraulic cylinders, said boxes including switches oriented thereupon in positions simulating the orientation of said hydraulic cylinders upon said frame, and means responsive to movement of a preselected one of said switches in a given direction for causing its counterpart hydraulic cylinder to be actuated in the same direction as said switch is moved.

5. The hydraulic locator of claim 2 wherein said control means includes an individual switch for controlling each individual hydraulic cylinder, valve means operatively controlled by each said switch and connected to said cylinders for selectively actuating said cylinders in extension and retraction, whereby actuation of preselected ones of said switches enables an operator to move said carriage and any attached structure into predetermined alignment positions responsive to actuation of said cylinders.

6. The hydraulic locator of claim 2 wherein an attachment bar is universally connected to said carriage for attachment thereto of structure to be located, adjustable brace means being connected to said carriage and to said attachment bar for orienting and stabilizing the attachment bar position relative to said carriage.

7. A hydraulic locator comprising:
 a. a frame;
 b. a carriage connected to said frame for movement with respect thereto;
 c. a plurality of hydraulically and individually actuatable cylinders connected to said frame and said carriage, each said connection being universal;
  (1) first and second ones of said cylinders positioned substantially parallel to one another for moving said carriage laterally, said second cylinder positioned above said first cylinder;
  (2) a third one of said cylinders vertically oriented for moving said carriage vertically, and
  (3) fourth, fifth and sixth ones of said cylinders positioned substantially parallel to one another for moving said carriage linearly, said fourth and fifth cylinders oriented in a common plane and said fifth and sixth cylinders oriented in a separate common plane;
 d. control means connected to said cylinders for simultaneously causing all said cylinders to be centered; and
 e. control means connected to said cylinders for actuating said cylinders individually and in selected combinations in a predetermined manner.

8. The hydraulic locator of claim 7 further comprising:
 a. jack means attached to said frame for raising and lower the same for stability and movement purposes.

9. The hydraulic locator of claim 7 further comprising:
 a. stabilizer means attached to a corner of said frame for leveling and stabilizing said frame.

10. The hydraulic locator of claim 7 further comprising:
 a. a hydraulic system making up a portion of said control means, said system comprising:
  (1) a hydraulic fluid reservoir;
  (2) a pump connected for pumping fluid from said reservoir;
  (3) fluid conduits connecting said pump to each of said cylinders and said cylinders to said reservoir; and
  (4) valve means in said conduits adapted to control selective and discrete actuation of said cylinders responsive to electrical signals from said control means and in selective slow and rapid operational sequences.

11. The hydraulic locator of claim 19 further comprising:
 a. pulse generating means in said hydraulic system for energizing said cylinder actuation in controllable cyclical movements and in incremental amounts.

12. The hydraulic locator of claim 10 further comprising:
 a. a pulse generator interconnected into said fluid conduits and including:
  (1) means defining a fluid chamber in fluid flow relation to fluid in said conduits;
  (2) a piston in said chamber adapted to impart a pressure surge to the fluid, and
  (3) strike receiving means connected to and adapted to transmit shocks to said piston; and
 b. a pulsing solenoid mounted adjacent said pulse generator and adapted to cyclically impart, upon command, impacts to said strike receiving means so as to cause incremental movement of selective ones of said cylinders.

13. A hydraulic locator comprising:
a. a frame;
b. a carriage mounted in floating relationship upon and with respect to said frame;
c. a plurality of piston-containing cylinders universally connected to said frame and said carriage so as to support and selectively move said carriage in any of six degrees of freedom;
d. universally adjustable attachment means attached to said carriage for receiving and positioning separate structure into a desired location; and
e. a hydraulic system interconnecting said cylinders for causing extension and retraction of their associated pistons, said system comprising:
   (1) pump, reservoir and fluid conduit means connected together and interconnecting said cylinders;
   (2) a pair of solenoid valves in a plurality of portions of said conduits, each of said pairs controlling one of said cylinders; and
   (3) a separate pair of solenoid valves in portions of said conduits common to and controlling rapid movement of all of said cylinders.

14. A hydraulic locator comprising:
(a) a frame;
(b) power means including a plurality of independent actuators individually attached to said frame;
(c) a carriage attached to each of said actuators and supported solely by said actuators for movement thereby through six degrees of freedom, said carriage adapted to have structure attached thereto for positioning thereby; and
(d) control means connected to said power means for causing said power means to precisely position said carriage and any structure affixed thereto, said control means comprising electrical switch means and valve means, said switch means connected to said valve means and said valve means connected to said power means so as to cause said power means to selectively move said carriage through any one or more of said six degrees of freedom.

15. A hydraulic locator comprising:
(a) a frame;
(b) a plurality of hydraulic cylinders, each of said cylinders having a first end universally connected to said frame;
(c) a movable piston in each of said hydraulic cylinders, each of said pistons having a piston rod extending from a second end of said cylinders;
(d) a carriage having an end from each of said piston rod universally connected thereto and adapted to be moved responsive to actuation of pre-selected ones of said hydraulic cylinders;
(e) means upon said carriage for securing structure thereto and for ultimate movement and positioning therewith;
(f) control means connected to said hydraulic cylinders for controlling independent and conjunctive movement thereof; and
(g) a piston and a centering switch mechanism in each said hydraulic cylinders and switch means in said control means actuatable in cooperation with said centering switch mechanism and means for causing said pistons in all said cylinders to be substantially centered therein and said carriage to be positioned in a substantially neutral position responsive to actuation of said centering switch mechanism and said switch means.

16. A hydraulic locator comprising:
(a) a frame;
(b) power means attached to said frame;
(c) a carriage attached to said power means for movement thereby through six degrees of freedom, said carriage adapted to have structure attached thereto for positioning thereby; and
(d) control means connected to said power means for causing said power means to precisely position said carriage and any structure affixed thereto, said control means comprising electrical switch means and valve means, said switch means connected to said valve means and said valve means connected to said power means so as to cause said power means to move said carriage through at least one of said six degrees of freedom, said control means including means to automatically and simultaneously center said hydraulic cylinders.

References Cited by the Examiner

UNITED STATES PATENTS

| | | | |
|---|---|---|---|
| 2,822,094 | 2/1958 | Greer | 241—1 X |
| 3,052,974 | 9/1962 | Williams | 29—407 |
| 3,066,805 | 12/1962 | Sullivan | 214—1 |
| 3,087,630 | 4/1963 | Karnow et al. | 214—1 |

GERALD M. FORLENZA, *Primary Examiner.*

R. G. SHERIDAN, *Assistant Examiner.*